US006801309B1

(12) United States Patent
Nelson

(10) Patent No.: US 6,801,309 B1
(45) Date of Patent: Oct. 5, 2004

(54) DETECTOR ARRAY WITH SCATTERED LIGHT CORRECTION

(75) Inventor: Steve Nelson, Mountain View, CA (US)

(73) Assignee: Therma-Wave, Inc., Fremont, CA (US)

( * ) Notice: Subject to any disclaimer, the term of this patent is extended or adjusted under 35 U.S.C. 154(b) by 7 days.

(21) Appl. No.: 10/266,808

(22) Filed: Oct. 8, 2002

Related U.S. Application Data

(60) Provisional application No. 60/329,893, filed on Oct. 16, 2001.

(51) Int. Cl.[7] .............................. G01J 3/02; G01J 3/28
(52) U.S. Cl. ..................... 356/307; 356/328; 356/369
(58) Field of Search .............................. 356/307, 326, 356/328, 369

(56) References Cited

U.S. PATENT DOCUMENTS

| 4,820,048 | A | * | 4/1989 | Barnard | 356/307 |
| 5,128,549 | A | * | 7/1992 | Kaye | 356/307 |
| 5,872,630 | A | * | 2/1999 | Johs et al. | 356/369 |
| 2003/0107733 | A1 | * | 6/2003 | Oka et al. | 356/328 |

FOREIGN PATENT DOCUMENTS

| JP | 56-57925 | * | 5/1981 | 356/328 |

* cited by examiner

*Primary Examiner*—F. L. Evans
(74) *Attorney, Agent, or Firm*—Stallman & Pollock

(57) ABSTRACT

The subject invention relates to a method of mitigating the effects of spurious background signals in spectroscopic measurement systems. The design of a broadband imagining spectrometer is disclosed that enables direct measurement of the spurious optical background intensity during spectroscopic measurements of a sample. The background is measured on a two dimensional surface coincident with the spectrometer exit plane. The background contribution is used to correct the measurements improving the accuracy of the spectroscopic intensity measurement.

12 Claims, 2 Drawing Sheets

DETECTOR ARRAY WITH SCATTERED LIGHT CORRECTION

PRIORITY CLAIM

The present application claims priority to U.S. Provisional Patent Application Ser. No. 60/329,893, filed Oct. 16, 2001, which is incorporated herein by reference.

TECHNICAL FIELD

The subject invention relates to the design of a detector array for use in a broadband imaging spectrometer. The invention is broadly applicable to the field of optical metrology, particularly optical metrology tools for performing measurements of patterned thin films on semiconductor integrated circuits.

BACKGROUND OF THE INVENTION

The use of thin film measurement technologies such as spectroscopic ellipsometry [SE], broadband reflectometry [BBR] and visible light reflectometry [VR] is well established. These technologies use a spectrometer to simultaneously gather information about the sample under test at different wavelengths. Examples in the prior art include U.S. Pat. Nos. 5,910,842 and 6,278,519 incorporated herein by reference. For optical wafer metrology the wavelength region of interest spans the VUV and NIR.

There are a number of optical metrology tools presently available for evaluating the characteristics of semiconductor wafers. One example of such a tool can be found in U.S. Pat. No. 6,278,519 cited above. In this tool, a broadband light source creates a probe beam that is focused onto the sample. The focused probe beam interacts with and reflects from the sample. The reflected probe beam is directed to a spectrometer for measuring variations in intensity versus wavelength. In this particular tool, the same spectrometer is used to obtain BBR data as well as SE data. Other prior art embodiments employ separate spectrometers for SE and BBR measurements. In either case, the spectrometer(s) will include an optical element, such as a grating, for dispersing the light as a function of wavelength. The dispersed light is directed onto a two-dimensional array of photo-detector elements that generate output signals corresponding to the intensity of the wavelength-dispersed light.

Ideally, in these measurements both the intensity and the angle of the incident light are substantially uniform over the illuminated spot. It is equally desirable to control the angular acceptance of the optical systems that collect the illumination after reflection from and interaction with the sample. This may be achieved through selection and location of apertures within the optical system.

It is well known to one of ordinary skill in the art that, in these instruments, the light reaching the detector includes contributions from at least two sources: the desired signal generated by light interacting with and specularly-reflecting from the sample, and an undesired spurious signal typically generated by light that is scattered from both the components of the spectrometer and sample being measured. The scattered light may adversely effect the BBR and SE measurements.

In mathematical terms the measured intensity at a given wavelength $I_T(\lambda_A)$ includes contributions due to reflection $I_R(\lambda_A)$ and scatter $I_T(\lambda_B)$ $$I_T(\lambda_A) = I_R(\lambda_A) + I_T(\lambda_B). \quad (1)$$

As indicated in equation 1 the scattered radiation reaching a detector element configured to detect wavelength region $\lambda_A$ may contain contributions from other wavelength ranges (i.e. $\lambda_B$ in equation 1). In general, the ratio of the scattered to detected intensity depends on wavelength and varies with the condition and morphology of the sample being measured.

Prior art approaches have attempted to account for the scattered contribution and correct the measured data with varying degrees of sophistication. The simplest approach is to assume that the effect is small and account for "sample dependent" variations by normalizing the measurements to those of a known sample. If these assumptions are invalid (i.e. scatter is non-negligible, or there are sample dependent effects) the data cannot be meaningfully corrected with this approach.

The next level of sophistication is to provide a detector to directly measure a fraction of the broadband radiation scattered out of the specularly-reflected beam. One prior art approach, illustrated in FIG. 1, locates a detector array 10, such that the wavelength dispersed, specularly-reflected beam illuminates a main measurement region 2 of array 10. Array 10 further includes a secondary region 4 located at one end of the array. Region 4 is located such that very little specularly-reflected light reaches region 4.

Array 10 is two-dimensional having a number of detecting elements across both its length (L) and its width (W). Region 4 is located at position to receive diffracted intensity corresponding to a wavelength region below the short-wavelength-cutoff ($\lambda_{short}$) of the metrology system bandwidth (approximately 195 nm in typical commercial UV-VIS instruments). This location avoids potential contamination of the scattered signal by high-order diffracted light and insures that scattered light is the dominant source of the signals generated by the detector in region 4. If the scattered light illuminating region 4 is similar, in both intensity and spectral makeup, to the scattered light illuminating region 2, the measured data can be corrected by subtraction the signals from region 2 using the signals from region 4. In principle, the measurements made in region 4 can also be used to correct for any systematic variation in the background intensity along the width (W) of detector 10.

This approach to correcting the data is only valid if the intensity of the scattered light is constant along the length (L) of detector 10. This may be a reasonable approximation if the scattered intensity is truly diffuse so that any scattering element sprays light evenly across the entire array so that the scattered intensity measured in region 4 is substantially equivalent to that in region 2. In practice, the spread of the scattered light is not perfectly diffuse; typically the light entering region 4 is more heavily influenced by the intensity of the light striking the neighboring pixels of region 2 than by the light striking pixels at the other end of the detector. Consequently, this correction approach can also be inadequate for high accuracy measurements.

Accordingly, it would be desirable to provide a detection approach that more accurately measures the contribution of optical scatter to the measured, spectrally dispersed signal. This would enable superior correction of the raw data and thereby improve the measurement accuracy of the metrology system.

SUMMARY OF THE INVENTION

A method for correcting spectroscopic intensity measurements that includes correction of the data to remove spurious optical background signals is disclosed. An array detector, divided into two regions, simultaneously measures the signal and background intensity at the exit plane of the system spectrometer. The background measurements are used to correct the signal data. Correction protocols are described which permit removal (subtraction) of background components that vary in either one or two dimensions across the detector surface. This permits increased accuracy in spectroscopic intensity measurements.

DETAILED DESCRIPTION OF THE PREFERRED EMBODIMENTS

Figure 2:
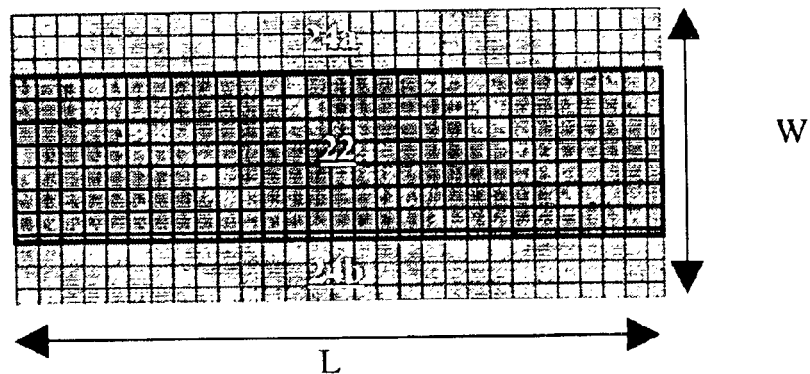
FIG. 2 is a schematic diagram of the preferred embodiment of the array detector of the present invention.

FIG. 2 illustrates a preferred embodiment 20 of an array detector that circumvents the limitations of the prior art and enables improved correction of the spectral data. Array 20 includes a main detecting region of the array 22 upon which the specularly reflected, wavelength dispersed probe beam is directed. The dispersion axis is parallel to the L direction.

Array 20 further includes two secondary detection regions, 24a and 24b, positioned above and below region 22 respectively. Regions 24a and 24b are arranged to intercept light that is scattered out of the specularly reflected probe beam. That is, regions 22, 24a and 24b are configured so that the specularly reflected light is fully contained within region 22; and regions 24a and 24b only receive scattered light.

By having pixels dedicated to receiving scattered light running along the entire length, L, of the spectrum we can get an estimate of the scattered intensity as a function of location. We no longer have to assume a single scattered light level. By making corrections along the L axis we can achieve an overall more-accurate measure of position-dependent scattering process and minimize the artifacts introduced when one assumes the scatter is uniform.

Figure 1:
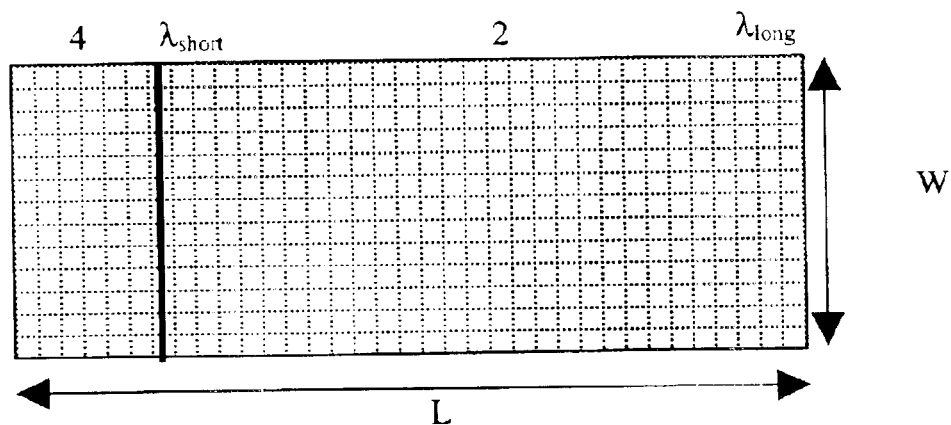
FIG. 1 is a schematic diagram of a prior art array detector.

Removing the scatter background in this new scheme follows the same general idea illustrated in FIG. 1, except now the correction for each pixel along the length, L, of the active area (region 22) would be determined by the scatter measured in the closest neighboring pixels of region 24. In the simplest case, one might assume the scatter contribution in any given pixel of region 22 is similar to the scatter level measured in pixels from regions 24a and 24B located vertically above or below it. In this case, to correct for scatter one could subtract the entire row of pixels just outside of region 22, in regions 24a and 24b, from the entire row (or rows) of corresponding pixels inside regions 22. As indicated by Equation 1 above, this subtraction would result in information that more accurately represents the desired reflected signal.

This simple method assumes that the scattered light measured just outside of region 22 is representative of the local scatter level. A more sophisticated approach could be to examine how the scatter level tapers off with distance from the active area (22), and then use that information to extrapolate back an assumed scatter level inside region 22. Still more complicated methods of using the distribution of scattered light found in regions 24a and 24b to correct for region 22 can be envisioned. The key concept is that by taking scatter measurements above and below the entire active area, L, we can determine the local scatter properties more accurately than by simply having a single dedicated scatter measurement located at one end of the active area.

The above described correction strategies result in improved measurement accuracy, particularly with respect to determination of the wavelength dependent intensity of the specularly reflected probe beam. This enables superior accuracy in the determination of the measured quantities derived from analysis of the spectral measurements. We note that the approach is particularly useful when the spectrum has a large dynamic range; here, the correction method may further increase the dynamic range of the metrology tool and therefore extend the useful measurement bandwidth of the metrology system.

In an alternative embodiment, only a single secondary region (either 24a or 24b) is provided to detect scattered light. Such a configuration can be implemented with a smaller detector array and result in reduced system cost. Such a configuration would result, for example, if the detector illustrated in FIG. 2 were terminated at the boundary between region 22 and 24a or, between regions 22 and 24b. In comparison to the above-described preferred embodiment, this latter configuration provides a smaller data set; this may result in reduced measurement accuracy and compromise the fidelity of the correction process.

Figure 3:
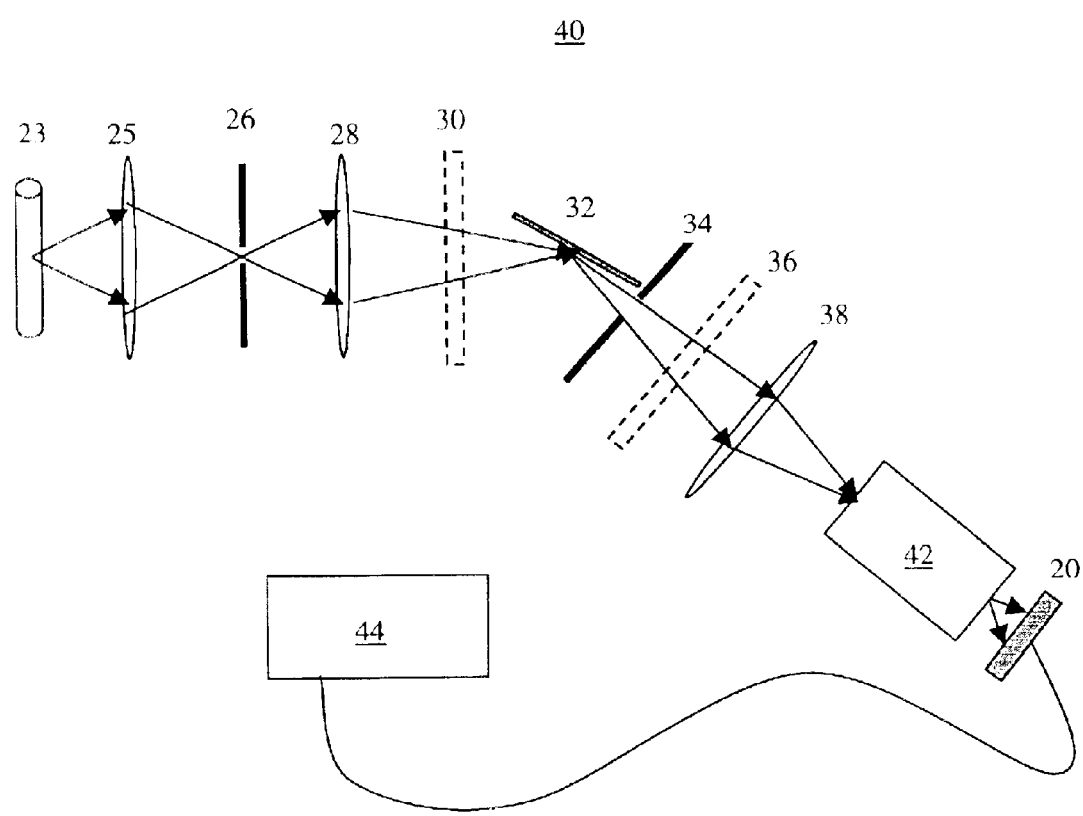
FIG. 3 is a schematic diagram of a spectroscopic ellipsometer (SE) system that incorporates the preferred embodiment of the detector illustrated in FIG. 2.

FIG. 3 illustrates a generalized spectroscopic ellipsometer (SE) system 40 incorporating detector 20 of the present invention. SE 40 comprises a broadband light source 23 creating a probe beam represented by arrows in the diagram. Collection optical system 25 collects a portion of the broadband illumination and focuses the illumination onto aperture 26. Fore-optics system 28 images aperture 26 onto the sample 32 through polarizing optical system 30. The illumination interacts with and reflects from the sample. A portion of the reflected beam is transmitted through aperture 34, passes through analyzing system 36 and is collected and focused onto the spectrometer entrance aperture by aft-optics system 38. The spectrometer 42 includes a wavelength dispersive element.

The wavelength dispersive element in conjunction with the spectrometer optical system generates wavelength-dispersed, chromatically separated images of the spectrometer entrance aperture at the exit plane of the spectrometer. Characteristically the spectrometer entrance aperture is a rectangular slit, whereby the chromatically separated images comprise, in aggregate, an illuminated rectangle. Detector 20, located at a position substantially coincident with the spectrometer exit plane, intercepts the transmitted illumination. Region 22 of detector 20 is located in a position substantially coincident with the illuminated rectangle and arranged to completely intercept and detect the specularly reflected illumination. Regions 24a and 24b of detector 20 are located to intercept and detect radiation scattered out of the specularly reflected beam. In the preferred embodiment detector 20 is a photodiode or CCD array detector configured as illustrated in FIG. 2.

Processor 44 records and analyzes the output signals generated by regions 22, 24a and 24b of detector 20 to determine the characteristics of sample 32. The analysis procedures include provision for correction of the spatially dependent "specularly reflected intensity" data derived from region 22 of the detector. Adverse effects produced by spatially dependent artifacts, notably optical scatter, are minimized, and the derived sample characteristics are more accurately determined from the optical measurements.

We remark that a highly simplified optical representation has been employed in FIG. 3. In particular, light source 23 and fore-optic system 28, aft optics system 38 and polarizing system 30 and analyzing system 38 may be, in practice, extremely complicated optical assemblies. For example, in one preferred embodiment light source 23 is a broadband multiple-wavelength light source that may include one or more broad-band continuum sources including NIR, visible, UV, DUV and VUV lamps. Alternatively, light source 23 could comprise a multi-wavelength, non-continuum source that combines the outputs of a plurality of lasers.

Similarly, fore-optics system 28 and aft optics system 38 may be complicated broadband optical systems that consist of multiple elements arranged in multiple groups. The spectrometer wavelength dispersive element may be a plane grating, a prism or a grating that is designed to impart pre-determined wavelength dependence to the diffracted intensity. In this latter case the regions of differing diffraction properties are preferably made concentric with each other. Detector 20 may be employed in conjunction with multiple detector elements and wavelength selective optical components including diffractive elements and dichroic mirrors to provide additional spectral separation and enhanced detection of both the chromatically separated probe beam and the scattered illumination.

While detector 20 is illustrated as comprising physically separated regions, there is no requirement for physical segregation of the detectors. Division of the data into regions 22, 24a and 24b can be accomplished during readout of a monolithic detector array or, alternatively, determined by the processor 44 during analysis of the measured data.

While the preferred embodiment illustrated in FIG. 3 is an SE system, the invention is applicable to a variety of spectroscopic measurement techniques. The precise form and function of the instrument are determined by the design and arrangement of the fore-optics systems 28 and 38 with respect to the sample 32. Therefore the invention is applicable to instruments that comprise one or more elements selected from the group including SE, transmission SE, BBR and optical CD metrology.

I claim:

1. An apparatus for measuring the intensity of broadband light across a range of wavelengths, said broadband light being collected after reflecting from a sample in a metrology tool, said apparatus comprising:

an optical element for angularly dispersing the broadband light along a first axis as a function of wavelength;

a first photodetector array positioned to receive light dispersed from the optical element along the first axis and oriented to measure light specularly reflected from the sample and generating first output signals as function of wavelength;

a second photodetector array positioned along side of the first photodetector array and extending parallel to said first axis and oriented to measure light scattered as the light passes through the metrology tool and generating second output signals as a function of wavelength and distance from the first photodetector array; and a processor for using the second output signals to correct the information derived from the first output signals as a function of wavelength, the processor further using the second output signals to correct information derived from the first output signals for each detector element of the first photodetector array by extrapolating measured light values from neighboring detector elements of the second photodetector array in order to account for scattered light in the first output signals.

2. An apparatus as recited in claim 1 wherein both the first and second arrays include multiple detector elements along the width thereof and wherein the processor determines the variation in the second output signals across the width thereof to correct for variations across the width of the first portion.

3. An apparatus as recited in claim 1 further including a third photodetector array positioned along side of the first photodetector array on the side opposite the second photodetector array and oriented to measure light scattered as the light passes through the metrology tool and generating third output signals as a function of wavelength and distance from the first photodetector array, said third output signals being used by the processor signals to correct the information derived from the first output signals.

4. An apparatus as recited in claim 1 wherein the metrology tool comprises one or more of the instruments selected from the group consisting of spectroscopic reflectometers, spectroscopic ellipsometers, polarized beam spectroscopic reflectometers, spectroscopic scatterometers and optical CD metrology tools.

5. A broadband optical spectrometer comprising:

an entrance aperture positioned to transmit received light;

a wavelength dispersive element for chromatically separating the transmitted light;

an array detector, located at a position substantially coincident with the spectrometer exit plane generating multiple output signals in response to the detected intensity;

optics arranged to direct light onto the wavelength dispersive element so that the dispersed light falls along an axis parallel to the detector array and so that chromatically separated images underfill the detector array in a direction perpendicular to the axis, dividing the array into at least two portions, with the first portion intercepting the chromatically separated images and generating first output signals in response thereto and with the second portion intercepting the optical background adjacent each of the chromatically separated images and generating second output signals in response thereto and with the boundary between the first and second portions being substantially parallel to the axis; and a processor for recording and analyzing the detector output signals and wherein the second output signals are used to adjust the first output signals as a function of wavelength and position relative to the axis to improve the accuracy of the spectroscopic intensity measurement.

6. A spectrometer as recited in claim 5 wherein the first and second portions are two separate but adjacent arrays.

7. A spectrometer as recited in claim 5 wherein the each portion of the array has multiple detector elements along the width thereof and wherein the processor determines the variation in the second output signals across the width thereof to correct for variations across the width of the first portion.

8. A spectrometer as recited in claim 5 wherein said detector includes a linearly extending third portion, located along said first portion on the side opposite said second portion, said third portion intercepting optical background and generating third output signals in response thereto and with the boundary between the first and third portions being substantially parallel to the axis, said third output signals being used by the processor to improve the accuracy of the spectroscopic intensity measurement.

9. A spectrometer as recited in claim 5 employed within one or more than one instrument selected from the group consisting of spectroscopic reflectometers, spectroscopic ellipsometers, polarized beam spectroscopic reflectometers, spectroscopic scatterometers and optical CD metrology tools.

10. A method for monitoring broadband light in a metrology tool, said metrology tool including a spectrometer having a wavelength dispersing element directing chromatically separated light onto a linear detector array, and wherein the detector array is configured so that specularly reflected and dispersed light falls along the detector axis in a first region, said detector array having a width extending beyond the first region to define a second region positioned to receive and measure scattered light, said method comprising the steps of:

generating first output signals from the first region of the detector array as a function of wavelength and position in the detector array;

generating second output signals from the second region of the detector array as a function of wavelength and position in the detector array; and adjusting the information generated by the first output signals using the second output signals as a function of wavelength and position in the detector array.

11. A method as recited in claim 10 further including the steps of:

generating third output signals from a third region of the detector array, said detector array having a width extending beyond the first region to define the third region positioned opposite the second region to receive and measure scattered light; and adjusting the information generated by the first output signals using the second and third output signals as a function of wavelength and position in the detector array.

12. A method as recited in claim 10 wherein the metrology tool comprises one or more of the instruments selected from the group consisting of spectroscopic reflectometers, spectroscopic ellipsometers, polarized beam spectroscopic reflectometers, spectroscopic scatterometers and optical CD metrology tools.

* * * * *